US012587722B2

(12) United States Patent
Liu et al.

(10) Patent No.: US 12,587,722 B2
(45) Date of Patent: Mar. 24, 2026

(54) SYSTEMS, METHOD AND NON-TRANSITORY COMPUTER-READABLE MEDIUM FOR GENERATING EROTIC MULTIMEDIA CONTENT

(71) Applicant: HYTTO PTE. LTD, Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 19/213,692

(22) Filed: May 20, 2025

(65) Prior Publication Data

US 2025/0365483 A1      Nov. 27, 2025

(30) Foreign Application Priority Data

May 27, 2024      (CN) .......................... 202410664208.7

(51) Int. Cl.
| | |
|---|---|
| *H04N 21/85* | (2011.01) |
| *A61H 19/00* | (2006.01) |
| *H04N 21/84* | (2011.01) |

(52) U.S. Cl.
CPC ............. *H04N 21/85* (2013.01); *A61H 19/30* (2013.01); *H04N 21/84* (2013.01); *A61H 2201/5023* (2013.01); *A61H 2201/5076* (2013.01); *A61H 2201/5082* (2013.01); *A61H 2201/5084* (2013.01)

(58) Field of Classification Search
CPC ........ H04N 21/84; H04N 21/85; A61H 19/30; A61H 2201/5023
USPC .......................................................... 725/32
See application file for complete search history.

(56) References Cited

U.S. PATENT DOCUMENTS

| | | | | |
|---|---|---|---|---|
| 11,985,376 | B2 * | 5/2024 | D'Amato | ......... H04N 21/43615 |
| 2016/0026242 | A1 * | 1/2016 | Burns | ................. G06F 3/04817 |
| | | | | 345/633 |
| 2017/0366858 | A1 * | 12/2017 | Olivares, II | ........... G11B 27/13 |
| 2024/0001228 | A1 * | 1/2024 | Gilg | ...................... A63F 13/285 |

\* cited by examiner

*Primary Examiner* — Dominic D Saltarelli
(74) *Attorney, Agent, or Firm* — Holtz, Holtz & Volek PC

(57) ABSTRACT

A method for generating erotic multimedia content. The method includes receiving, via a system, content-generative parameters associated with output signal of an adult toy, wherein the adult toy is configured to provide haptic stimulation to a human user; generating, via the system, erotic multimedia content based on the content-generative parameters and a pre-trained content generation model; and, causing to display, via the system, the erotic multimedia content towards the human user, wherein the erotic multimedia content is configured to present content plotlines matching the content-generative parameters, and type of the erotic multimedia content includes at least one of video, audio, image, or text.

20 Claims, 6 Drawing Sheets

500

501 receiving content-generative parameters

502 in response to receiving the content guidance parameter, generate the erotic multimedia content based on the content-generative parameters, the content guidance parameter and the content generation model

500 receiving content-generative parameters                                          501 in response to receiving the content guidance parameter, generate
the erotic multimedia content based on the content-generative
parameters, the content guidance parameter and the content
generation model                                                                 502

700

SYSTEMS, METHOD AND NON-TRANSITORY COMPUTER-READABLE MEDIUM FOR GENERATING EROTIC MULTIMEDIA CONTENT

TECHNICAL FIELD

The present invention relates to the field of computer technology, and more particularly to a system, method and non-transitory computer-readable medium for generating erotic multimedia content.

BACKGROUND

Multimedia content is characterized by diversity and richness, which provides unique advantages in information dissemination and engagement. Currently, when generating multimedia content, it is common to control the content plotlines of the multimedia content based on, for example, outlines (e.g., text prompt), in order to produce the desired content.

However, when using the aforementioned approach, the following technical issue is often encountered:

Traditional methods for generating multimedia content are limited in their ability to modify or update the content once it is generated. This results in a suboptimal experience when interacting with the multimedia content.

Furthermore, when using traditional neural network models for multimedia content generation, the following technical issue is encountered:

This limitation results in a relatively limited variety of content plotlines in the generated multimedia content.

The information disclosed in the background section is provided to enhance understanding of the context of the present invention and is not necessarily limited to prior art known to those skilled in the art.

SUMMARY

Various embodiments of the present disclosure disclose methods, systems and non-transitory computer-readable medium for generating erotic multimedia content. In an embodiment, a method is disclosed. The method includes receiving, via a system, content-generative parameters associated with output signal of an adult toy, wherein the adult toy is configured to provide haptic stimulation to a human user; generating, via the system, erotic multimedia content based on the content-generative parameters and a pre-trained content generation model; and, causing to display, via the system, the erotic multimedia content towards the human user, wherein the erotic multimedia content is configured to present content plotlines matching the content-generative parameters, and type of the erotic multimedia content includes at least one of video, audio, image, or text.

In another embodiment, a system is disclosed. The system includes a memory storing computer-readable instructions; and a processor coupled to the memory and configured to execute the computer-readable instructions, wherein the computer-readable instructions, when executed by the processor, cause the processor to perform operations comprising: receiving content-generative parameters associated with output signal of an adult toy, wherein the adult toy is configured to provide haptic stimulation to a human user; generating erotic multimedia content based on the content-generative parameters and a pre-trained content generation model; and, causing to display the erotic multimedia content towards the human user, wherein the erotic multimedia content is configured to present content plotlines matching the content-generative parameters, and type of the erotic multimedia content includes at least one of video, audio, image, or text.

In another embodiment, a non-transitory computer-readable medium is disclosed. The non-transitory computer-readable medium storing instructions that, when executed by a processor of a first viewer device, cause the processor to perform operations comprising: receiving content-generative parameters associated with output signal of an adult toy, wherein the adult toy is configured to provide haptic stimulation to a human user; generating erotic multimedia content based on the content-generative parameters and a pre-trained content generation model; and, causing to display the erotic multimedia content towards the human user, wherein the erotic multimedia content is configured to present content plotlines matching the content-generative parameters, and type of the erotic multimedia content includes at least one of video, audio, image, or text.

BRIEF DESCRIPTION OF THE FIGURES

The accompanying drawings illustrate embodiments of the invention and, together with the description, serve to explain the principles of the invention.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present invention are described hereinafter with reference to FIG. 1 to FIG. 7.

Figure 1:
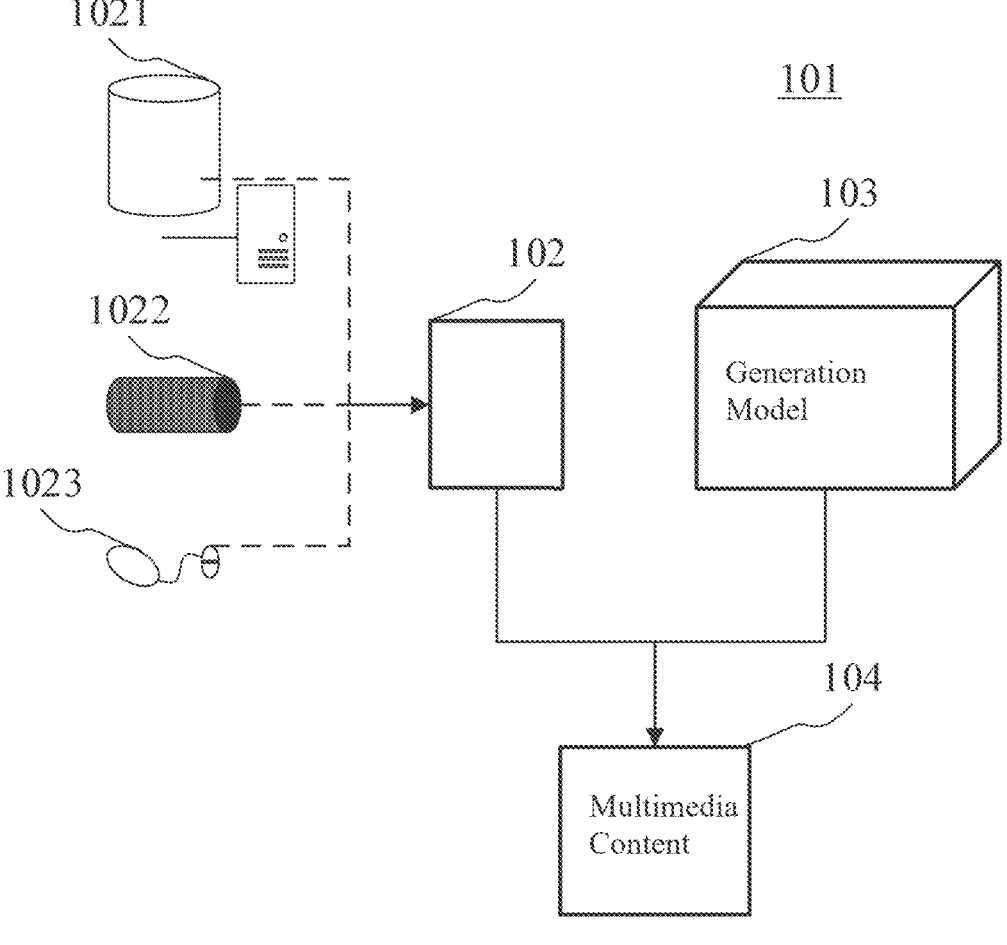
FIG. 1 is a schematic diagram depicting an application scenario of a system for generating erotic multimedia content according to some embodiments.

FIG. 1 is a schematic diagram illustrating an exemplary application scenario of a method for generating erotic multimedia content according to embodiments of the present disclosure.

In an application scenario depicted in FIG. 1, a computing device (101) is configured to receive a content-generative parameters (102) associated with output signal of an adult toy. The content-generative parameters (102) including at least one of the following: physiological information of a human user (e.g., heart rate, body temperature), device information of an adult toy (e.g., type, operational specifications), sensor information of the adult toy (e.g., motion frequency, humidity, acceleration), and control information of the adult toy (e.g., predefined operational modes, intensity settings).

In one application scenario, first, the computing device 101 may receive a content-generative parameters 102, wherein the content-generative parameters 102 is associated with output signal of an adult toy, the adult toy is configured to provide haptic stimulation to a human user, including at least one of the user physiological information of a human user, the toy device information of the adult toy, the toy sensor information of the adult toy, and the toy control information of the adult toy. For example, the toy device information, the toy sensor information, and the toy control information may correspond to a male adult toy 1022, and specifically, the male adult toy 1022 may be a device with a reciprocating telescopic function. For another example, the toy device information, the toy sensor information, and the toy control information may correspond to a female adult toy 1023. For another example, the user's physiological information may be obtained through a server 1021, and specifically, the female adult toy 1023 may be a device with a vibration function. Secondly, the computing device 101 can generate erotic multimedia content 104 according to the content-generative parameters 102 via the pre-trained content generation model 103, wherein the erotic multimedia content 104 is configured to present content plotlines matching the content-generative parameters 102 to the human user. The erotic multimedia content 104 is configured to present a narrative or scenario (e.g., storyline, visual/audio sequence) that aligns with the content-generative parameters 102. The content type of the erotic multimedia content 104 includes, but is not limited to: video (e.g., dynamic scenes with virtual characters), audio (e.g., voice narratives, soundtracks), image (e.g., static or animated visuals), text (e.g., interactive scripts), and optionally, game-based content (e.g., gameplay scenarios influenced by parameters such as plot progression, visual rendering, or game mechanics). For example, when the content type of the erotic multimedia content 104 is an audio type, the erotic multimedia content 104 can be audio or a voice book. For instance, if the erotic multimedia content 104 is of an audio type, it may comprise an audio clip or an audiobook. If the erotic multimedia content 104 is of an image type, it may include static images (e.g., JPEG, PNG) or animated sequences (e.g., GIF, MP4). For game-type content, the content-generative parameters may govern narrative branching, visual elements, or gameplay progression (e.g., adjusting difficulty based on output signal of an adult toy). In practice, the content plotlines can represent the content plotlines of the multimedia content matching the content-generative parameters. For example, taking the target type as a game type as an example, the content plotlines can be the development plot of the game plot.

It should be noted that the computing device 101 can be hardware or software installed in the hardware device. When the computing device is hardware, it can be implemented as a distributed cluster consisting of multiple servers or terminal devices, or as a single server or a single terminal device. For example, when the above-mentioned execution subject is a single terminal device, it can be a portable terminal device, such as a mobile phone, a tablet computer, etc. When the computing device is embodied as software, it can be installed in the hardware devices listed above. It can be implemented as multiple software or software modules for providing distributed services, or as a single software or software module. No specific limitation is made here.

It is noted that the number of computing devices in FIG. 1 is merely illustrative and may vary based on application requirements.

Figure 2:
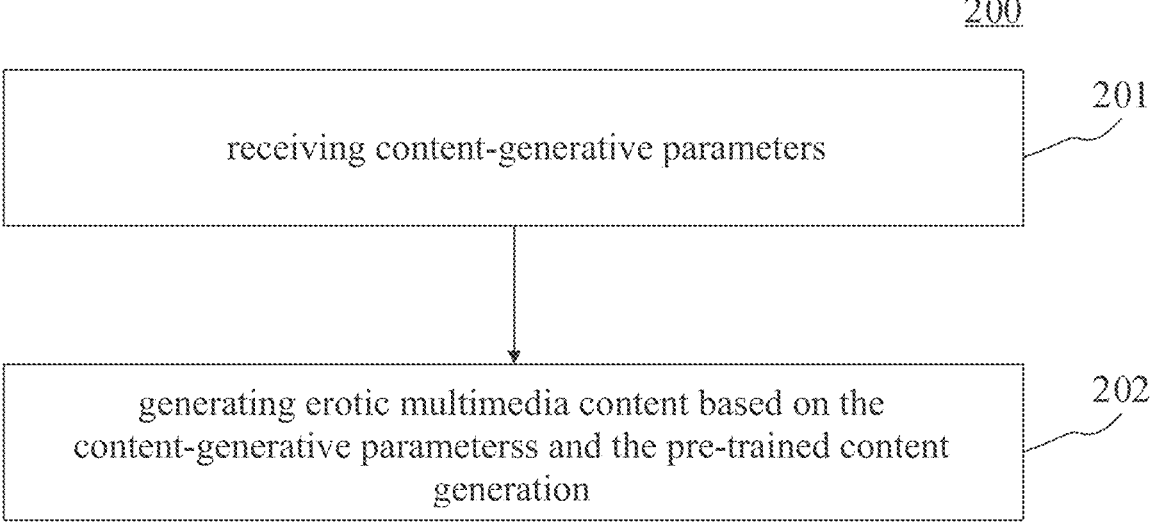
FIG. 2 is a flowchart illustrating steps of a method for generating erotic multimedia content.
Figure 3:
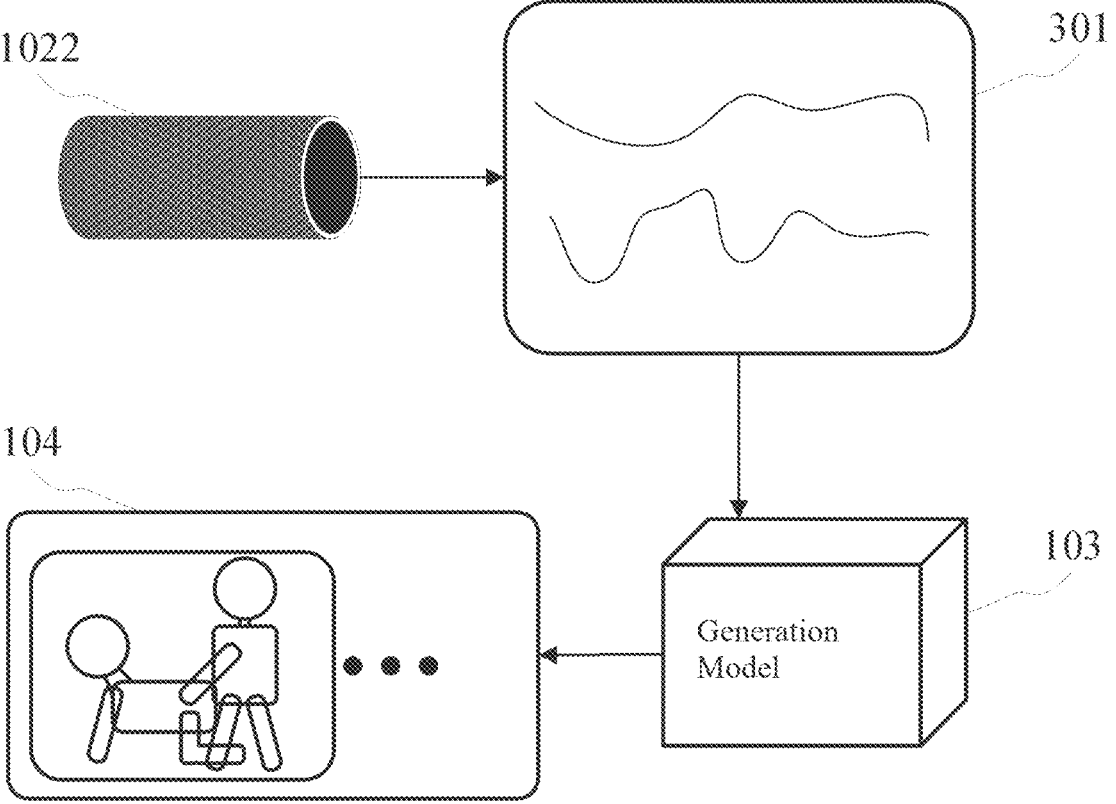
FIG. 3 is a schematic diagram of another application scenario, demonstrating synchronization between sensor data from a male adult toy and dynamically generated video content.

FIG. 2 illustrates a flowchart (200) of a method for generating erotic multimedia content according to embodiments of the present disclosure. The method comprises step 201 and step 202.

Step 201, receiving content-generative parameters.

In some embodiments, a computing device (e.g., the computing device 101 in FIG. 1) serves as an execution entity to receive the content-generative parameters via wired or wireless communication interfaces. Non-limiting examples of wireless communication include Wi-Fi, Bluetooth, Zigbee, or cellular networks. The content-generative parameters is associated with output signal of an adult toy including at least one of: user physiological information of a human user (e.g., heart rate, body temperature), toy device information of an adult toy (e.g., type, operational specifications), toy sensor information (e.g., motion frequency, humidity, acceleration), and toy control information (e.g., predefined operational modes, intensity settings). The human user may be a user to watch the erotic multimedia content and operatively associated with the adult toy. Thus the adult toy is configured to provide haptic stimulation to a human user. The user physiological information may be information related to the user's physiological state. In practice, the user physiological information may include: user sexual preference. Wherein, the user sexual preference may be the human user's preference for sexual objects and sexual behaviors. For example, the user sexual preference may be obtained based on the historical behavior of the human user. In practice, for example, the user physiological information may be collected by a health management device associated with the human user, or may be obtained by analyzing the information collected by the health management device. For example, the health management device may be a "smart bracelet", or a "smart watch", or may be a dedicated device with the ability to collect temperature and heart rate. For another example, the user physiological information may also be collected by a sensor equipped with an adult toy, or may be obtained by analyzing the information collected by the adult toy.

The adult toy may be associated with the human user. In practice, for example, there is a usage relationship association between the adult toy and the human user. For example, the adult toy is bound to the user account of the human user. The toy device information may represent the information of the adult toy used by the human user. For another example, there is a communication connection association between the adult toy and the human user. For example, the human user may control the adult toy by voice control. Among them, the toy sensor information may represent the sensor parameters collected by the internal sensor when the adult toy is running. In practice, the toy sensor information may include: vibration intensity. Among them, the vibration intensity represents the vibration intensity of the adult toy when it is running.

The toy control information represents the toy control mode of the adult toy. For example, the adult toy can set different toy control modes by different vibration intensities, such as low-speed vibration mode, medium-speed vibration mode and high-speed vibration mode. For another example, the adult toy can set different toy control modes by different swing amplitudes, such as low-amplitude swing mode, medium-amplitude swing mode and high-amplitude swing mode. For another example, the toy control mode can be set in combination with multiple parameters, such as setting different toy control modes in combination with vibration intensity and swing amplitude. In practice, the toy control mode can also be set in a customized form. Specifically, when the human user turns on the adult toy and the adult toy collects relevant parameters, the toy sensor information and toy control information can be sent to the execution subject. Specifically, for the toy control information, the execution subject can guide the user to set or select the toy control mode through voice guidance to generate the toy control information. For example, the voice guidance content can be "I am glad to meet you, please select the toy control mode". In some embodiments, the execution entity (e.g., computing device 101) generates the erotic multimedia content by processing the content-generative parameters through a pre-trained content generation model. In practice, in addition to the preset voice guidance content, different voice guidance content can also be generated through the AI (Artificial Intelligence) model. Specifically, for example, since the content generation model can generate audio-type multimedia content, when the human user uses the adult toy, the content generation model can be triggered to generate voice guidance content. For another example, a voice guidance content generation module can also be set separately to generate corresponding voice guidance content when the human user uses the adult toy, wherein the voice guidance content generation module can be embedded with a pre-trained machine learning model for generating voice prompt content.

As an example, the user can customize multiple parameters to obtain a customized toy control mode, for example, customize the swing amplitude, vibration intensity, temperature and other parameters to obtain a customized toy control mode. For example, the customized toy control mode may be a control mode of medium amplitude swing, high vibration intensity, and preset temperature.

As another example, the toy control mode can also be quickly set by customizing the usage scenario. For example, the usage scenario may be a "preheating scenario", and the corresponding toy control mode may be a control mode of low amplitude swing, low vibration intensity, and preset temperature. For another example, the usage scenario may be a "sprint scenario", and the corresponding toy control mode may be a control mode of high amplitude swing, high vibration intensity, and preset temperature. For another example, the usage scenario may be a "rhythm scenario", and the corresponding toy control mode may be a control mode of controlling the swing amplitude and vibration intensity through a periodic function.

As another example, the toy control mode can be generated by an AI model based on the user's adult toy usage habits. Specifically, the AI model can be a prediction model based on a time series. The AI model can analyze the toy control mode that matches the human user based on the human user's adult toy usage. For example, when using adult toys, both user A and user B prefer to use high vibration intensity, but because user A is more sensitive, in order to ensure the adult toy usage experience of user A, the vibration intensity of the toy control mode for user A generated by the AI model can be slightly lower than the toy control mode for user B generated by the AI model, so as to reduce the stimulation of user A and increase the usage time. By generating toy control modes through AI models, the effect of thousands of faces can be achieved to meet the different usage preferences of individual users.

It should be noted that the above-mentioned wireless connection method may include but is not limited to 3G/4G/5G connection, WiFi connection, Bluetooth connection, WiMAX connection, Zigbee connection, UWB (ultra wideband) connection, and other wireless connection methods currently known or to be developed in the future.

Step 202, generating erotic multimedia content based on the content-generative parameterss and the pre-trained content generation.

In some embodiments, the above-mentioned execution subject may generate erotic multimedia content according to content-generative parameterss and pre-trained content generation models. Among them, the above-mentioned erotic multimedia content can be used to display content plots matching the above-mentioned content-generative parameterss to the above-mentioned human user. The content type of the erotic multimedia content may include, but is not limited to: video type, audio type, image type, and text type. The content generation model may be a model that generates multimodal erotic multimedia content in combination with content-generative parameterss. For example, the content generation model may be a GPT (Generative Pre-trained Transformer) model. In practice, before the content-generative parameterss are input into the content generation model, the above-mentioned execution subject may filter the content-generative parameterss through a pre-constructed sensitive word list, and obtain the erotic multimedia content according to the filtered content-generative parameterss and the content generation model.

The erotic multimedia content is configured to present a narrative or scenario (e.g., storyline, visual/audio sequence) that aligns with the content-generative parameters. The content type of the erotic multimedia content includes, but is not limited to: video (e.g., dynamic scenes with virtual characters), audio (e.g., voice narratives, soundtracks), image (e.g., static or animated visuals), text (e.g., interactive scripts).

In practice, the erotic multimedia content may be multimedia content generated in real time and matched with the content-generative parameterss. The erotic multimedia content may also be multimedia content generated in non-real time and matched with the content-generative parameterss. The output signal of the adult toy is configured to provide real-time feedback to the content changes of the erotic multimedia. Further change of the present content plotlines of the erotic multimedia is configured to correspond nearly in real time to the changes of the output signal of the adult toy. Thus, in the process of solving physiological needs, there is no need to deliberately provide prompts to AI model (the pre-trained content generation model of the present embodiment), so that AI model can output corresponding content without additional input operation by human user.

Real-Time vs. Non-Real-Time Generation. In some embodiments, the above-mentioned execution subject may generate erotic multimedia content in non-real-time. In non-real-time generation embodiment, the erotic multimedia content is produced based on static inputs (e.g., predefined text, images). For example: a user-input text describing an adult-oriented scenario (e.g., "a simulated interaction between an Asian female with long hair and an Asian male") may generate a pre-rendered video with corresponding virtual characters. User-uploaded images depicting specific poses may generate static or animated visual sequences. Control parameters from the adult toy (e.g., preset vibration patterns) may influence narrative elements in pre-generated content. In some embodiments, the above-mentioned execution subject may generate erotic multimedia content in real-time. In real-time generation embodiment, the erotic multimedia content dynamically adapts to real-time changes in the content-generative parameters. For instance, sensor data from a reciprocating adult toy (e.g., a male device with telescopic motion) may include motion frequency, which directly modulates the action frequency of virtual characters in the generated video. As the telescopic frequency increases during use, the virtual characters' motion frequency proportionally escalates, synchronizing physical interaction with digital content. Physiological feedback (e.g., heart rate spikes) or sudden changes in toy control modes may trigger immediate scene transitions (e.g., shifting from a "preliminary" to a "climax" scenario).

As an example, when the content type is a video type, the erotic multimedia content may be a video containing at least one content plotlines. When the content type is an audio type, the erotic multimedia content may be an audio containing at least one content plotlines. For example, the erotic multimedia content may be an audio segment or a voice book. When the content type is an image type, the erotic multimedia content may be an image containing at least one content plotlines. For example, the erotic multimedia content may be a static image or a dynamic image. When the content type is a text type, the erotic multimedia content may be a text containing at least one content plotlines. For example, the target media content may be a novel text. Examples of content types includes video that comprises a sequence of scenes depicting virtual characters performing actions (e.g., limb movements, posture changes) synchronized with sensor data. Examples of content types includes audio, such as a voice-driven narrative or soundtrack dynamically adjusted to match the intensity of adult toy operations (e.g., louder audio during high-frequency vibrations). Examples of content types includes image, such as static visuals (e.g., jpeg) or animated frames (e.g., gif) rendered to reflect user preferences or real-time inputs. Examples of content types includes text, such a as interactive scripts or dialogue trees (e.g., in a novel format) influenced by user behavior or device parameters.

Example A, the above-mentioned execution subject may generate non-real-time erotic multimedia content according to the content-generative parameters. For example, the content-generative parameters may be a text input by the human user. For example, the text input by the user may be a text describing a sex scene, "the sex process of an Asian woman with long hair and ponytails and an Asian man". For another example, the content-generative parameters may be a picture input by the human user. For example, pictures of different sex positions. For another example, the content-generative parameters may be a control parameter of an adult toy. The above-mentioned execution subject may generate a non-real-time video containing adult content according to the text input by the human user, the picture input by the human user, and the control parameter of the adult toy in the above-mentioned example through the above-mentioned content generation model.

Example B, the above-mentioned execution subject may generate a erotic multimedia content that changes in real time and matches the content-generative parameters in real time. For example, as the adult toy is running, the toy sensor information changes in real time, and through the above-mentioned content generation model, a video containing adult content that changes with the content-generative parameterss is generated. For example, when the adult toy is a device with a reciprocating telescopic function (such as a masturbation cup), the toy sensor information may include: the telescopic frequency of the masturbation cup. As the human user uses the masturbation cup, the telescopic frequency of the masturbation cup changes, and the action frequency of the virtual object contained in the erotic multimedia content may also change accordingly. For example, when the telescopic frequency increases, the action frequency of the virtual object contained in the erotic multimedia content also increases. In practice, the action frequency of the virtual object may be the frequency of the adult character contained in the erotic multimedia content performing adult actions.

Example C, the above-mentioned execution subject may generate the erotic multimedia content containing adult content according to the content-generative parameterss. Specifically, referring to the schematic diagram of another application scenario of the multimedia content generation method shown in FIG. 3, the above-mentioned execution subject may collect the toy sensor information 301 of the male adult toy 1022. In the application scenario of FIG. 3, the toy sensor information 301 may be the frequency signal and amplitude signal of the male adult toy 1022 during use. Then, the execution subject can generate a erotic multimedia content 104 of video type containing adult content through the content generation model 103 and the toy sensor information 301.

Example D, the execution subject can also update the erotic multimedia content containing adult content according to the content condition parameter. Specifically, referring to the schematic diagram of another application scenario of the multimedia content generation method shown in FIG. 4, on the basis of the toy sensor information 301 generated by the male adult toy 1022, the user input 401 (e.g., "change adult posture") of the human user can also be obtained, and the content generation model 103 can update the erotic multimedia content 104 containing adult content based on the user input 401 and the toy sensor information 301. The application scenario shown in FIG. 4 can be the change of adult posture in the multimedia content.

Example E, when playing multimedia content, if the content-generative parameters is received, the multimedia content is adjusted in time; otherwise, the multimedia content is played according to the rules before the content-generative parameters is received. For example, when playing a video, if the relevant parameters of the adult toy are received, the subsequent playback plot of the video is adjusted in real time. If the content-generative parameters is not received later, the video continues to be played according to the last adjusted plot. Alternatively, when playing a game, if relevant parameters of adult toys are received, the direction of the game is adjusted. If no content-generative parameterss are received later, the game plot after the last adjustment is continued.

Example F, since the content multimedia content is multimodal data, the content-generative parameterss can be normalized before being input into the content generation model to ensure data consistency. In addition, the content generation model may include: a generative adversarial network, a recurrent neural network, and a neural network model based on a Transformer structure. Among them, the generative adversarial network may include: a generator and a discriminator. Among them, the generator is used to perform.

Figures 4, 5:
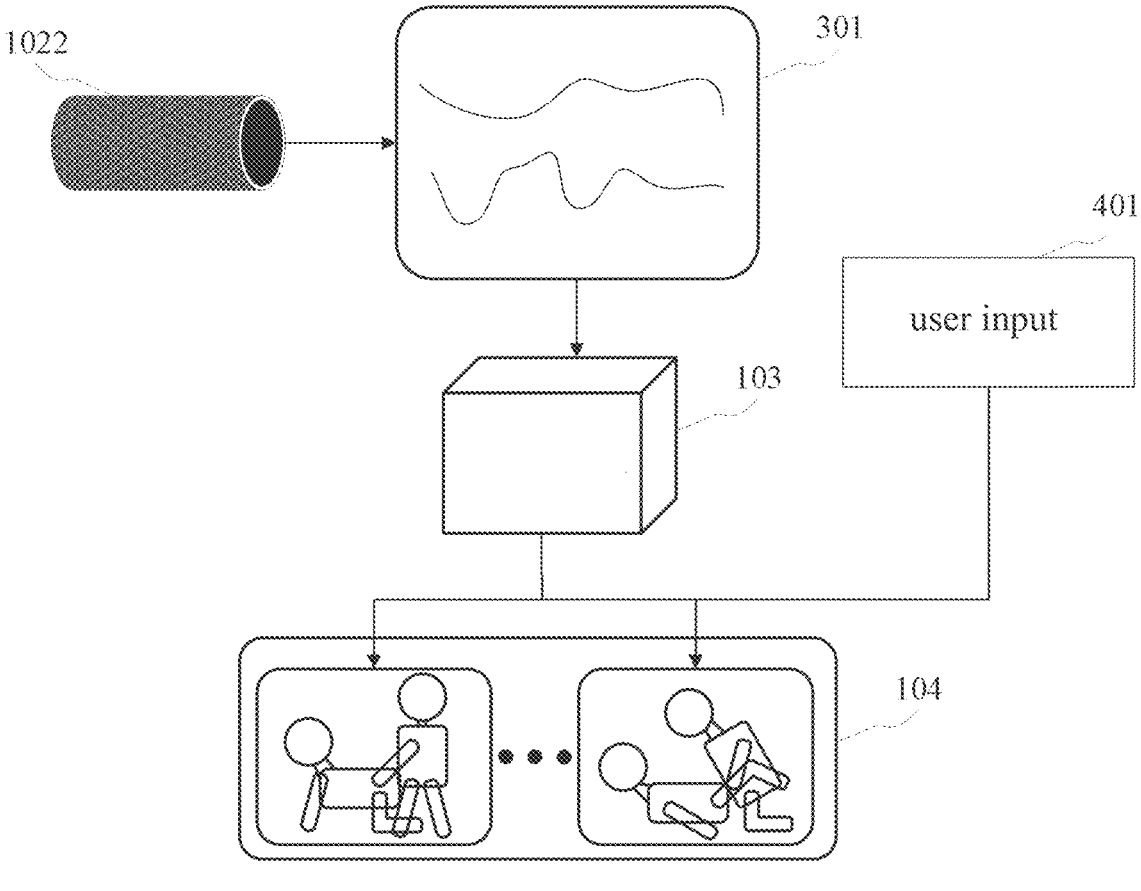
FIG. 4 is a schematic diagram of a further application scenario, showing erotic multimedia content updates based on output signal of an adult toy and real-time sensor feedback.
FIG. 5 is a flowchart detailing additional embodiments of the method.

Referring to FIG. 5, a process 500 of another embodiment of a multimedia content generation method is shown. The process 500 of the multimedia content generation method includes the following steps:

Step 501, receiving content-generative parameters.

In some embodiments, the execution subject of the multimedia content generation method (e.g., the computing device 101 shown in FIG. 1) may receive the above-mentioned content-generative parameterss.

Wherein, the above-mentioned content-generative parameterss are associated with at least one of the user physiological information of the human user, the toy device information of the adult toy, the toy sensor information of the above-mentioned adult toy, and the toy control information of the above-mentioned adult toy. The above-mentioned human user is associated with the above-mentioned adult toy.

Optionally, the toy sensor information may include the device parameters of the above-mentioned adult toy when it is running. Wherein, the toy sensor information may include but is not limited to at least one of the following: humidity parameter, temperature parameter, acceleration parameter, angle parameter, brightness parameter, frequency parameter and amplitude parameter. The device parameters included in the toy sensor information may match the above-mentioned erotic multimedia content clock. Specifically, the device parameters generated by the adult toy when in use and included in the toy sensor are clock-synchronized with the erotic multimedia content. For example, when an adult toy performs reciprocating motion, the content of the corresponding reciprocating motion in the erotic multimedia content is similar or identical to the frequency, amplitude, and acceleration of the adult toy when performing reciprocating motion.

Among them, the humidity parameter can be obtained by collecting the humidity sensor. In practice, the humidity sensor can be set inside the adult toy to collect the surface humidity of the adult toy when it is running. Specifically, depending on the type of adult toy, the humidity parameter can correspond to the outer surface humidity or inner surface humidity of the adult toy. For example, for a male adult toy with an inner cavity, the humidity sensor can collect the surface temperature of the inner cavity to obtain the humidity parameter. For another example, for a female adult toy with a vibration function, the humidity sensor can collect the surface temperature of the female adult toy to obtain the humidity parameter.

Among them, the temperature parameter can be obtained by collecting the temperature sensor. In practice, the temperature parameter can correspond to the outer surface temperature and the inner surface temperature of the adult toy. For example, for a male adult toy with an inner cavity, the temperature sensor can collect the surface temperature of the inner cavity to obtain the temperature parameter. For another example, for a female adult toy with a vibration function, the temperature sensor can collect the surface temperature of the female adult toy to obtain the temperature parameter.

Among them, the angle parameter can characterize the angle change of the adult toy when it is in use. The acceleration parameter can characterize the acceleration change of the adult toy when it is in use. In practice, the acceleration parameter and the angle parameter can be collected by the IMU (Inertial measurement unit) inertial measurement unit device.

Among them, the brightness parameter can characterize the brightness change of the surrounding environment when the adult toy is in use. In practice, the brightness parameter can be collected by a light sensor set in the adult toy.

Among them, the frequency parameter can characterize the frequency of position change of the adult toy when it is in use. In practice, the frequency parameter can be collected by an accelerometer. For example, for male adult toys with reciprocating telescopic functions, during the reciprocating motion, the value and direction of the acceleration will change periodically with the periodic reciprocating motion. Therefore, the frequency parameter can be obtained according to the acceleration change collected by the accelerometer.

Among them, the amplitude parameter can characterize the amplitude of the position change of the adult toy when it is in use. In practice, since the critical position acceleration of the amplitude change is approximately 0, the amplitude parameter can be obtained by converting the acceleration collected by the accelerometer through the formula of velocity, displacement, time and acceleration. For example, for male adult toys with reciprocating telescopic functions, the amplitude parameter can characterize the reciprocating amplitude change of male adult toys in the reciprocating motion cycle As an example, the above-mentioned execution subject can generate erotic multimedia content that matches and changes in real time with the real-time change of the content-generative parameterss. For example, with the real-time changing toy sensor information during the operation of the adult toy, a video containing adult content that changes with the change of the content-generative parameterss is generated through the above-mentioned content generation model. For example, the above-mentioned execution subject can detect the posture and posture change of the human user according to the parameters collected by the gyroscope contained in the IMU inertial measurement unit, and generate erotic multimedia content corresponding to the posture and posture change. For example, when the human user is standing, the erotic multimedia content can include adult content with a virtual object of the opposite sex in the rear-entry position, and specifically refer to the adult posture shown in the erotic multimedia content 104 in FIG. 3. For example, when the human user is lying, the erotic multimedia content can include adult content with a virtual object of the opposite sex in the upper position. Specifically, refer to the adult posture shown in the erotic multimedia content 104 in FIG. 3. For example, when the human user changes from a sitting position to a standing position, the erotic multimedia content can be converted from adult content containing a virtual object of the opposite sex in the upper body position to adult content containing a virtual object of the opposite sex in the rear entry body position. For example, it can be determined whether the human user is in an orgasm state (such as an ejaculation state) based on whether the human user presses the orgasm button on the adult toy, or based on the parameters collected by the IMU inertial measurement unit, and the erotic multimedia content can contain adult content in the orgasm state.

Optionally, the user physiological information may include: user physiological state. Among them, the user physiological state can represent the real-time physiological state of the human user when using the adult toy. In practice, the user physiological state may include but is not limited to at least one of the following: user heart rate, user body temperature, and user local area temperature. In practice, the user heart rate can represent the real-time heart rate of the human user when using the adult toy, and can also represent the average heart rate of the human user during the use of the adult toy. The user body temperature can represent the real-time body temperature of the human user when using the adult toy, and can also represent the average body temperature of the human user when using the adult toy. The user's local area temperature can represent the real-time temperature corresponding to the local skin of the human user using the adult toy, or the average temperature corresponding to the local skin of the human user using the adult toy. Specifically, the device parameters included in the above-mentioned toy sensor information are collected by the sensor elements contained in the above-mentioned adult toy. The above-mentioned user physiological state is obtained by collecting or analyzing the sensor elements contained in the above-mentioned adult toy. In practice, the user's physiological state can also be converted according to at least one of the user's heart rate, the user's body temperature, and the user's local area temperature. For example, first, the above-mentioned execution subject can convert the user's heart rate, the user's body temperature, and the user's local area temperature into a feature vector. Then, the user's physiological state is generated through a classification model such as a decision tree.

Optionally, the toy device information may include but is not limited to: toy type and toy quantity. Among them, the toy type represents the toy type of the adult toy used by the human user. For example, according to the functional classification of adult toys, the toy type may include but is not limited to: vibration type, simulation type. Among them, the vibration type adult toy can provide stimulation through vibration. The simulation type adult toy characterizes the shape and texture of adult organs through simulation to provide users with use. The number of toys represents the number of adult toys being used by the human user. In practice, the content-generative parameterss are determined according to the toy type, the number of toys and the toy control information. According to the toy type and the number of toys, the execution subject can selectively accept the toy sensor information and toy control information associated with the corresponding adult toy.

As an example, the erotic multimedia content can be associated with the toy type of the adult toy. In practice, when the toy type is a simulation type, for example, the adult toy can be a masturbation cup, and at this time, the erotic multimedia content can include the use screen of the masturbation cup. For another example, the adult toy can be a simulation doll, and the erotic multimedia content can include the expression and action changes of the virtual doll corresponding to the simulation doll of audio type and video type.

Step 502, in response to receiving the content guidance parameter, generate the erotic multimedia content based on the content-generative parameters, the content guidance parameter and the content generation model.

In some embodiments, in response to receiving the content guidance parameter, the execution subject can generate the erotic multimedia content according to the content-generative parameters, the content guidance parameter and the content generation model. Among them, the content guidance parameter is the input of the human user. Optionally, the content guidance parameter can be a parameter input by the human user that has a guidance relationship with the generation of the erotic multimedia content. In practice, content guidance parameters can be used to constrain constraint parameters of erotic multimedia content. For example, content guidance parameters can be keywords input by human users, such as content guidance parameters can be ["adult", "couple", "white skin"]. In practice, the above-mentioned execution subject can use content guidance parameters as constraints to control the erotic multimedia content generated by the content generation model. For another example, the content guidance parameter can be "produce a voice book about a twin-tailed Asian woman and her neighbor having sex".

Optionally, content guidance parameters can be preset in the content generation model. In actual use, users do not need to input adult-related content, and adult/pornography-related content can be directly output.

Optionally, the erotic multimedia content can be multimedia content containing adult content. For example, the erotic multimedia content can be multimedia content including interactions between adult sexual organs. For another example, the erotic multimedia content can be multimedia content including sexual behavior using adult toys that are the same as or matching adult toys.

Optionally, the parameter types of content guidance parameters include: text parameter type, image parameter type, audio parameter type, video parameter type and game parameter type. Among them, the content guidance parameter of the text parameter type can be a constraint parameter of the constraint erotic multimedia content in text form. The content guidance parameter of the image parameter type can be a constraint parameter of the constraint erotic multimedia content in image form. The content guidance parameter of the audio parameter type can be a constraint parameter of the constraint erotic multimedia content in audio form. The content guidance parameter of the video parameter type can be a constraint parameter of the constraint erotic multimedia content in video form. The content guidance parameter of the game parameter type can be a constraint parameter of the constraint erotic multimedia content in game parameter form.

Example A, the content guidance parameter can be a user input. Specifically, the content guidance parameter can be different inputs generated by the user in sequence.

For example, when the user enters an application or a web page, the user can be prompted to enter the content guidance parameter and generate the erotic multimedia content accordingly. When a new content guidance parameter is entered as the user watches, the erotic multimedia content can be updated according to the newly entered content guidance parameter.

Example B, taking the content guidance parameter of the text parameter type as an example, the content guidance parameter can be a constraint keyword in the form of a key-value pair. For example, the content guidance parameter can be: {skin color: white; number of people: 2; age: 25 years old;}.

Example C, taking the content guidance parameter of the text parameter type as an example, the content guidance parameter can be a constraint keyword in the form of a question-answer pair. For example, the question-answer pair corresponding to the content guidance parameter can be:
{[(C: guide me to generate some constraint keywords), (Y: good)],
[(C: desired location), (Y: indoor)],
[(C: desired number of protagonists), (Y: 2 people)],
[(C: desired skin color of the protagonist), (Y: yellow)],
[(C: desired race of the protagonist), (Y: Asian)]}.

Example D, taking the content guidance parameter of the image parameter type as an example, for example, the content guidance parameter can be an image that constrains the facial image of the protagonist. For another example, the content guidance parameter can be a background image that constrains the scene of the multimedia content. For another example, the content guidance parameter can be an action image of different sexual behaviors. In particular, when the parameter type of the content guidance parameter is an image type, a warning of infringement that may be caused by the content guidance parameter of the image parameter type and caused to other subjects or individuals has been initiated to the human user, and the human user has obtained confirmation of the non-infringement behavior in response to the warning. For example, the warning message may be "The above image may infringe other subjects or individuals, including but not limited to portrait rights. Please carefully confirm before use. If there is any infringement, please click to reject or replace other images without infringement."

Example E, taking the content guidance parameter of the audio parameter type as an example, for example, the content guidance parameter can be a constraint parameter input by the human user in the form of voice to constrain the erotic multimedia content. For example, the voice content corresponding to the content guidance parameter can be "generate a video containing two-person adult content."

Example F, taking the content guidance parameter of the video parameter type as an example, for example, the content guidance parameter can be a constraint parameter in the form of a video input by the human user, which constrains the erotic multimedia content. For example, the video content corresponding to the content guidance parameter can be "a video segment containing two-person adult content".

Example G, taking the content guidance parameter of the game parameter type as an example, for example, the content guidance parameter can be the game screen of the current frame. For another example, the content guidance parameter can be a description of the game screen in text form. For another example, the content guidance parameter can be the game parameter of the current frame. Specifically, when the content guidance parameter of the game parameter type changes compared to the previous moment, the changed erotic multimedia content can be generated accordingly.

Optionally, the content guidance parameter includes description information related to adult content. Or the above content guidance parameter includes description information that can trigger adult content. In practice, when the content guidance parameter includes description information that can trigger adult content, the content guidance parameter can be in the form of but not limited to the content guidance parameter in the above examples A to F. When the content guidance parameter includes description information related to adult content, the above content guidance parameter can be a constraint parameter obtained by refining the content including but not limited to the examples in the above examples A to F.

Example G, for example B, the content guidance parameter can be a constraint parameter after keyword extraction of the question-answer pair, for example, the content guidance parameter can be {location: indoor; number of protagonists: 2 people; skin color of protagonists: yellow; race of protagonists: Asian}.

Example H, for example C, the content guidance parameter can be a constraint parameter after image content extraction of the image, for example, when the image is a facial image, the content guidance parameter can be {skin color: white; hair color: red; whether double eyelids: yes; whether freckles: yes}. For another example, when the image is a background image of the scene where the content occurs, the content guidance parameter can be {weather: cloudy; whether it contains a bed: yes; indoor dimness: dim}.

Example I, for example D, the content guidance parameter can be a constraint parameter obtained after voice content extraction of the voice, for example, the content guidance parameter can be {number of people: 2 people}.

Example J, for example E, the content guidance parameter can be a constraint parameter obtained after video content extraction of the video, for example, the content guidance parameter can be {number of people: 2 people}.

Example K, for Example F, the content guidance parameter may be a constraint parameter obtained by extracting content from the game screen or the description of the game screen. For example, the content guidance parameter may be {protagonist posture: half-lying; whether to use adult toys: yes}.

In some optional implementations of some embodiments, the execution subject generates the erotic multimedia content in response to receiving the content guidance parameter according to the content-generative parameters, the content guidance parameter and the content generation model, which may include the following steps:

The first step is to generate at least one virtual object matching the content guidance parameter according to the content guidance parameter and the content generation model.

Wherein, the virtual object is an object in the erotic multimedia content. In practice, the virtual object may be a character image, or an anime image or other non-character image. In practice, the content generation model may include: a guidance sentence generation model and a multimedia content generation model. Wherein, the input of the guidance sentence generation model is the content guidance parameter. The output of the guidance sentence generation model is the guidance sentence. The input of the multimedia content generation model is the content-generative parameters, the target virtual object and the content guidance parameter. The output of the multimedia content generation model is the erotic multimedia content. Specifically, both the guide sentence generation model and the multimedia content generation model can adopt pre-trained generation models. Among them, the model complexity of the guide sentence generation model is lower than the model complexity of the multimedia content generation model.

Figure 6:
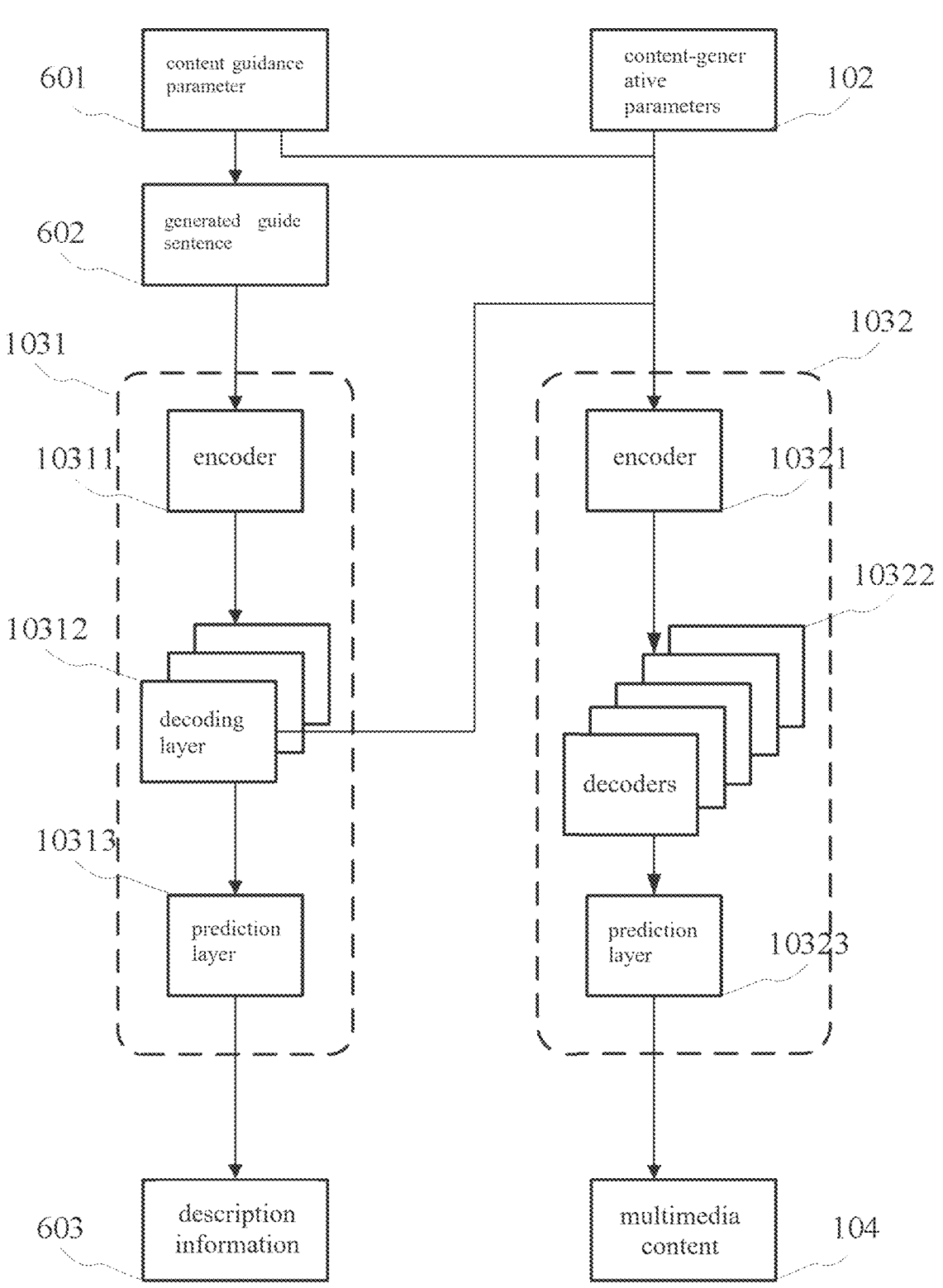
FIG. 6 is a schematic diagram illustrating a content generation process.

As an example, in the schematic diagram of the multimedia content generation process shown in FIG. 6, the content guidance parameter 601 can be {gender: female; height: 1.68 meters}, and the generated guide sentence 602 can be "Based on 'gender female, height 1.68 meters, generate multiple different and complete image descriptions'". The description information 603 obtained for at least one virtual object can be {"She is a woman with a height of 1.68 meters, brown wavy hair, dark brown eyes, clear facial lines, and simple and generous clothes", "She is a woman with a height of 1.68 meters, straight golden hair, emerald eyes, round facial lines, and a purple long skirt"}. Among them, the content generation model can include: a guide sentence generation model 1031 and a multimedia content generation model 1032. The guide sentence generation model 1031 includes: an encoder 10311, M decoders 10312 and a text prediction layer 10313. Specifically, the value of M in FIG. 3 can be 3. The multimedia content generation model 1032 includes: an encoder 10321, N decoders 10322 and a multimodal prediction layer 10323. Specifically, the value of N in FIG. 3 can be 5. Among them, M is less than N. The multimodal prediction layer includes multiple prediction heads of different modalities to generate erotic multimedia content of different content types. The abovementioned execution subject can use the content-generative parameters 102, the description information of the target virtual object and the content guidance parameter 601 as inputs of the multimedia content generation model 1032 to obtain the erotic multimedia content 104. Specifically, since the decoding layer 10312 outputs the description information vector of the description information of the target virtual object, in order to avoid the waste of computing resources caused by the encoder's repeated encoding of the text, the above-mentioned execution subject can directly use the description information vector of the description information of the target virtual object as the input of the multimedia content generation model 1032.

Optionally, encoder 10311 and encoder 10321 may both include: W parallel encoders and feature mapping networks. Among them, the W parallel encoders respectively perform multimodal feature extraction on content-generative parameters and content guidance parameters of different modalities. The feature mapping network is used to project the features output by the W parallel encoders to the same feature space to achieve feature alignment. Specifically, the feature mapping network can use a downsampling network to project the features output by the W parallel encoders to the same feature space.

The model structure of the content generation model in the above "some optional implementations in some embodiments" and "optionally" as an inventive point of the present disclosure solves the technical problem 2 mentioned in the background technology, that is, "traditional neural network models are often unimodal, that is, they cannot effectively process multimodal data, resulting in a relatively simple content plotlines of the generated multimedia content". Based on this, the content generation model in the present disclosure first sets a guide sentence generation model and a multimedia content generation model. The content guidance parameters are converted into description information for virtual objects through the guidance sentence generation model, so that the human user can select the virtual objects contained in the erotic multimedia content before the erotic multimedia content is generated, so as to avoid the problem that the directly generated erotic multimedia content does not match the user's needs. Then, the erotic multimedia content is generated according to the multimedia content generation model. In particular, in order to avoid the waste of computing resources caused by repeated feature extraction, the present disclosure directly uses the description information vector of the description information of the target virtual object generated by the decoder included in the guidance sentence generation model as the input of the multimedia content generation model, avoiding repeated feature extraction of the encoder included in the multimedia content generation model. Then, considering that the content-generative parameters and content guidance parameters may be multimodal data, the W parallel encoders included in the guidance sentence generation model and the W parallel encoders included in the multimedia content generation model in the present disclosure are multimodal content-generative parameters and content guidance parameters, and the features corresponding to different modal data are mapped to the same feature space through the feature mapping network, so as to achieve the effect of feature extraction and application for different modal data. In this way, multimodal multimedia content generation can be combined with multimodal data.

In the second step, in response to the human user completing the object selection of the at least one virtual object, the virtual object selected by the human user from the at least one virtual object is determined as the target virtual object.

As an example, the execution subject may use the virtual object corresponding to the description information that she is a woman with a height of 1.68 meters, with straight golden hair, green eyes, round facial lines, and wearing a purple dress as the target virtual object.

In the third step, the erotic multimedia content is generated according to the target virtual object, the content-generative parameters, the content guidance parameter, and the content generation model.

In practice, the execution subject may input the target virtual object, the content-generative parameters, and the content guidance parameter into the multimedia content generation model to generate the erotic multimedia content.

Optionally, the content scene type corresponding to the erotic multimedia content may include: pre-content scene type, mid-term content scene type, hotspot scene type, post-content scene type, and transition content scene type. Among them, the content plotlines of the pre-content scene type may be the beginning stage of adult content. The content plotlines of the mid-term content scene type may represent the main part of adult content, such as a description of the sexual behavior process. The content plotlines of the hotspot scene type can represent the process description of the climax of the adult content. The content plotlines of the post-content scene type can represent the ending of the adult content. The content plotlines of the transition content scene type represents the transition between different adult contents.

In practice, the above-mentioned execution subject can classify the content scene types of the content plots in different time periods contained in the erotic multimedia content according to the content plots contained in the erotic multimedia content. Specifically, the above-mentioned execution subject can classify the content segments of the erotic multimedia content with different content plots through multiple classifiers to determine the content scene corresponding to the erotic multimedia content. For example, the multiple classifiers can be implemented through a fully connected layer to generate a 1×5 feature vector, wherein the 5 feature vector values in the 1λ5 feature vector correspond to the pre-content scene type, the mid-term content scene type, the hotspot scene type, the post-content scene type, and the transition content scene type. The feature vector value represents the confidence.

Optionally, the content plotlines corresponding to the erotic multimedia content includes the content plotlines of the at least one of the human body movement change, the human body action amplitude change, and the human body action frequency change. In practice, the above-mentioned execution subject can classify the corresponding content plotlines of the virtual object contained in the erotic multimedia content through another multiple classifier. For example, multiple classifiers can be implemented through a fully connected layer to generate a 1×3 feature vector, wherein the three feature vector values in the 1×3 feature vector correspond to the virtual object's limb movement change plot, the virtual object's movement amplitude change plot, and the virtual object's movement frequency change plot. The feature vector value represents the confidence.

As can be seen from FIG. 5, compared with the description of some embodiments corresponding to FIG. 2, the present disclosure first refines the steps of generating the above-mentioned erotic multimedia content based on content-generative parameterss, content guidance parameters and the above-mentioned content generation model, in order to avoid the problem that the generated erotic multimedia content does not match the content of the human user, especially the problem that the virtual objects contained in the erotic multimedia content do not match the human user's expectations. The present disclosure adds a step of generating virtual objects for the target object to select, thereby reducing the probability that the subsequently generated erotic multimedia content does not match the content expected by the human user. The user's viewing experience for multimedia content is further improved.

Figure 7:
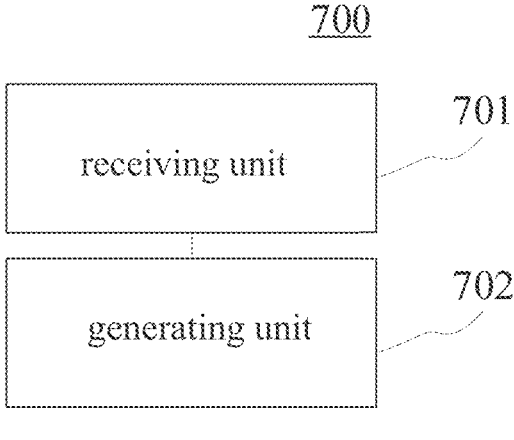
FIG. 7 is a block diagram of a multimedia content generation apparatus.

Further referring to FIG. 7, as an implementation of the methods shown in the above Figures, the present disclosure provides some embodiments of a multimedia content generation device, which corresponds to the method embodiments shown in FIG. 2, and the multimedia content generation device can be specifically applied to various electronic devices.

As shown in FIG. 7, a multimedia content generation device 700 of some embodiments includes: a receiving unit 701 and a generating unit 702. The receiving unit 701 is configured to receive content-generative parameterss, wherein the content-generative parameterss are associated with at least one of the user physiological information of the human user, the toy device information of the adult toy, the toy sensor information of the adult toy, and the toy control information of the adult toy, and the human user is associated with the adult toy; the generating unit 702 is configured to generate erotic multimedia content according to the content-generative parameterss and the pre-trained content generation model, wherein the erotic multimedia content is used to display the content plotlines matching the content-generative parameterss to the human user, and the content type of the erotic multimedia content includes: video type, audio type, image type and text type.

In some optional implementations of some embodiments, the erotic multimedia content is multimedia content containing adult content.

In some optional implementations of some embodiments, the generation unit 702 is further configured to: in response to receiving the content guidance parameter, generate the erotic multimedia content according to the content-generative parameters, the content guidance parameter and the content generation model, wherein the content guidance parameter is a parameter input by the human user and has a guidance relationship with the generation of the erotic multimedia content.

In some optional implementations of some embodiments, the parameter types of the content guidance parameter include: text parameter type, image parameter type, audio parameter type, video parameter type and game parameter type.

In some optional implementations of some embodiments, the content guidance parameter includes description information related to adult content, or the content guidance parameter includes description information that can trigger adult content.

In some optional implementations of some embodiments, the generation unit 702 is further configured to: generate at least one virtual object matching the content guidance parameter according to the content guidance parameter and the content generation model; in response to the human user completing the object selection of the at least one virtual object, determine the virtual object selected by the human user from the at least one virtual object as the target virtual object; generate the erotic multimedia content according to the target virtual object, the content-generative parameters, the content guidance parameter and the content generation model.

In some optional implementations of some embodiments, the toy sensor information includes the device parameters of the adult toy when it is running, and the toy sensor information includes at least one of humidity parameter, temperature parameter, acceleration parameter, angle parameter, brightness parameter, frequency parameter and amplitude parameter, and the device parameters included in the toy sensor match the erotic multimedia content clock.

In some optional implementations of some embodiments, the user physiological information includes: user physiological state, the device parameters included in the toy sensor information are collected by the sensor element included in the adult toy, and the user physiological state is collected or analyzed by the sensor element included in the adult toy.

In some optional implementations of some embodiments, the toy device information includes: toy type and toy quantity, and the content-generative parameterss are determined according to the toy type, the toy quantity and the toy control information.

In some optional implementations of some embodiments, the content scene types corresponding to the erotic multimedia content include: pre-content scene types, mid-term content scene types, hotspot scene types, post-content scene types and transition content scene types.

In some optional implementations of some embodiments, the content plotlines corresponding to the erotic multimedia content includes: at least one of the virtual object limb movement change plot, the virtual object movement amplitude change plot and the virtual object movement frequency change plot.

It can be understood that the units recorded in the multimedia content generation device 700 correspond to the steps in the method described with reference to FIG. 2. Therefore, the operations, features and beneficial effects described above for the method are also applicable to the multimedia content generation device 700 and the units contained therein, and will not be repeated here.

Figure 8:
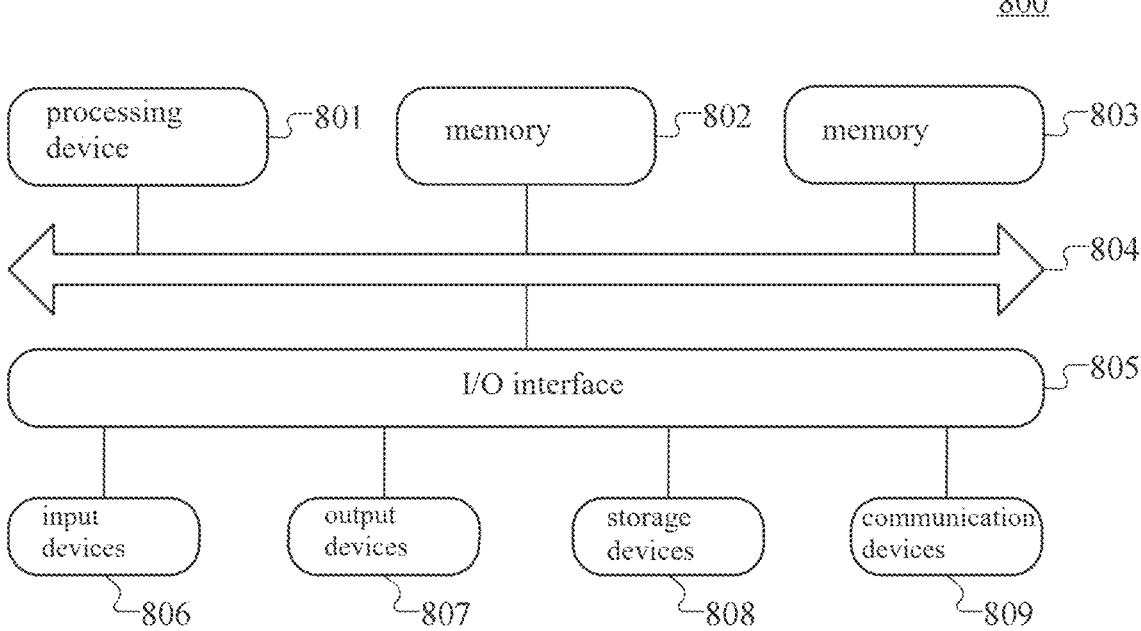
FIG. 8 is a structural diagram of an electronic device suitable for implementing embodiments of the invention.

Referring to FIG. 8, a schematic diagram of the structure of an electronic device (the computing device 101 shown in FIG. 1) 800 suitable for implementing some embodiments of the present disclosure is shown. The electronic device shown in FIG. 8 is only an example and should not impose any restrictions on the functions and scope of use of the embodiments of the present disclosure.

As shown in FIG. 8, the electronic device 800 may include a processing device (such as a central processing unit, a graphics processor, etc.) 801, which can perform various appropriate actions and processes according to a program stored in a read-only memory 802 or a program loaded from a storage device 808 to a random access memory 803. Various programs and data required for the operation of the electronic device 800 are also stored in the random access memory 803. The processing device 801, the read-only memory 802, and the random access memory 803 are connected to each other via a bus 804. The input/output interface 805 is also connected to the bus 804.

Typically, the following devices may be connected to the I/O interface 805: input devices 806 including, for example, a touch screen, a touchpad, a keyboard, a mouse, a camera, a microphone, an accelerometer, a gyroscope, etc.; output devices 807 including, for example, a liquid crystal display (LCD), a speaker, a vibrator, etc.; storage devices 808 including, for example, a magnetic tape, a hard disk, etc.; and communication devices 809. The communication device 809 may allow the electronic device 800 to communicate with other devices wirelessly or wired to exchange data. Although FIG. 8 shows an electronic device 800 with various devices, it should be understood that it is not required to implement or have all the devices shown. More or fewer devices may be implemented or have alternatively. Each box shown in FIG. 8 may represent one device, or may represent multiple devices as needed.

In particular, according to some embodiments of the present disclosure, the process described above with reference to the flowchart may be implemented as a computer software program. For example, some embodiments of the present disclosure include a computer program product including a computer program carried on a computer-readable medium, the computer program including program code for executing the method shown in the flowchart. In some such embodiments, the computer program can be downloaded and installed from the network through the communication device 809, or installed from the storage device 808, or installed from the read-only memory 802. When the computer program is executed by the processing device 801, the above functions defined in the methods of some embodiments of the present disclosure are executed.

It should be noted that the computer-readable medium recorded in some embodiments of the present disclosure may be a computer-readable signal medium or a computer-readable storage medium or any combination of the above. The computer-readable storage medium may be, for example, but not limited to, an electrical, magnetic, optical, electromagnetic, infrared, or semiconductor system, device or device, or any combination of the above. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In some embodiments of the present disclosure, a computer-readable storage medium may be any tangible medium containing or storing a program that can be used by or in combination with an instruction execution system, device, or device. In some embodiments of the present disclosure, a computer-readable signal medium may include a data signal propagated in a baseband or as part of a carrier wave, which carries a computer-readable program code. Such propagated data signals may take a variety of forms, including but not limited to electromagnetic signals, optical signals, or any suitable combination of the above. A computer-readable signal medium may also be any computer-readable medium other than a computer-readable storage medium, which may send, propagate, or transmit a program for use by or in combination with an instruction execution system, device, or device. The program code contained on the computer-readable medium may be transmitted using any appropriate medium, including but not limited to: wires, optical cables, RF (radio frequency), etc., or any suitable combination of the above.

In some embodiments, the client and the server may communicate using any currently known or future developed network protocol such as HTTP (Hyper Text Transfer Protocol), and may be interconnected with digital data communications (e.g., communication networks) of any form or medium. Examples of communication networks include local area networks ("LAN"), wide area networks ("WAN"), internets (e.g., the Internet), and peer-to-peer networks (e.g., ad hoc peer-to-peer networks), as well as any currently known or future developed networks.

The computer-readable medium may be included in the electronic device; or it may exist independently without being assembled into the electronic device. The computer-readable medium carries one or more programs, and when the one or more programs are executed by the electronic device, the electronic device: receives content-generative parameterss, wherein the content-generative parameterss are associated with at least one of the user physiological information of the human user, the toy device information of the adult toy, the toy sensor information of the adult toy, and the toy control information of the adult toy, and the human user is associated with the adult toy; generates erotic multimedia content according to the content-generative parameterss and the pre-trained content generation model, wherein the erotic multimedia content is used to display content plots matching the content-generative parameterss to the human user, and the content types of the erotic multimedia content include: video type, audio type, image type, and text type.

Computer program code for performing the operations of some embodiments of the present disclosure may be written in one or more programming languages or a combination thereof, including object-oriented programming languages such as Java, Smalltalk, C++, and conventional procedural programming languages such as "C" or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer through any type of network, including a local area network (LAN) or a wide area network (WAN), or may be connected to an external computer (e.g., through the Internet using an Internet service provider).

The flowcharts and block diagrams in the accompanying drawings illustrate the possible architecture, functions, and operations of the systems, methods, and computer program products according to various embodiments of the present disclosure. In this regard, each box in the flowchart or block diagram may represent a module, a program segment, or a portion of a code, which contains one or more executable instructions for implementing a specified logical function. It should also be noted that in some alternative implementations, the functions marked in the boxes may also occur in a different order than that marked in the drawings. For example, two boxes represented in succession may actually be executed substantially in parallel, and they may sometimes be executed in reverse order, depending on the functions involved. It should also be noted that each box in the block diagram and/or flowchart, and the combination of boxes in the block diagram and/or flowchart, may be implemented by a dedicated hardware-based system that performs the specified function or operation, or may be implemented by a combination of dedicated hardware and computer instructions.

The units described in some embodiments of the present disclosure may be implemented by software or by hardware. The described units may also be set in a processor, for example, it may be described as: a processor includes a receiving unit and a generating unit. Among them, the names of these units do not constitute a limitation on the unit itself in some cases, for example, the receiving unit may also be described as "receiving content-generative parameterss, wherein the above content-generative parameterss are associated with at least one of the user physiological information of the human user, the toy device information of the adult toy, the toy sensor information of the above adult toy, and the toy control information of the above adult toy, and the above human user is associated with the above adult toy".

The functions described above in this article can be at least partially performed by one or more hardware logic components. For example, without limitation, exemplary types of hardware logic components that can be used include: field programmable gate array (FPGA), application specific integrated circuit (ASIC), application specific standard product (ASSP), system on chip (SOC), complex programmable logic device (CPLD), etc.

The above description is only some preferred embodiments of the present disclosure and an explanation of the technical principles used. Those skilled in the art should understand that the scope of the invention involved in the embodiments of the present disclosure is not limited to the technical solutions formed by the specific combination of the above-mentioned technical features, but also should cover other technical solutions formed by any combination of the above-mentioned technical features or their equivalent features without departing from the above-mentioned inventive concept. For example, the above-mentioned features are replaced with the technical features with similar functions disclosed in the embodiments of the present disclosure (but not limited to) by each other.

The invention claimed is:

1. A method for generating erotic multimedia content, the method comprising:

receiving, via a system, content-generative parameters associated with an output signal output by an adult toy, the adult toy being configured to provide haptic stimulation to a human user;

generating, via the system, erotic multimedia content based on (i) the content-generative parameters associated with the output signal output by the adult toy and (ii) a pre-trained content generation model; and controlling to present, via the system, the erotic multimedia content to the human user, wherein the erotic multimedia content comprises content plotlines matching the content-generative parameters, and wherein a type of the erotic multimedia content includes at least one of video, audio, image, or text.

2. The method of claim 1, wherein:

the generating the erotic multimedia content comprises generating, via the system, the erotic multimedia content based on the content-generative parameters, an input content, and the pre-trained content generation model, and the input content is convertible into the erotic multimedia content in real time or near-real time.

3. The method of claim 2, wherein the input content is input by the human user and has a guidance relationship with respect to the generation of the erotic multimedia content.

4. The method of claim 2, wherein the input content includes descriptive information, the descriptive information being related to erotic content or being capable of triggering erotic content.

5. The method of claim 1, wherein the output signal of the adult toy is configured to provide real-time feedback in response to content changes of the erotic multimedia content.

6. The method of claim 1, wherein a change of the content plotlines of the erotic multimedia content corresponds nearly in real time to changes of the output signal output by the adult toy.

7. The method of claim 1, wherein the generating generates the erotic multimedia content based only on the content-generative parameter and the pre-trained content generation model.

8. The method of claim 1, further comprising, before the generating the erotic multimedia content:

generating, via the system, at least one virtual object matching a content guidance parameter based on the pre-trained content generation model; and determining, via the system, a target virtual object based on a selection made in response to the human user completing selection of a virtual object from among the at least one virtual object, wherein the generating generates the erotic multimedia content based on the pre-trained content generation model and a combination of the target virtual object, the content-generative parameters, and the content guidance parameter.

9. The method according to claim 1, wherein the output signal output by the adult toy includes at least one of physiological information of the human user, device information of the adult toy, sensor information of the adult toy, or control information of the adult toy.

10. The method according to claim 9, wherein;

the sensor information of the adult toy comprises device parameters of the adult toy during operation, the device parameters of the adult toy comprises at least one of the following: humidity parameters, temperature parameters, acceleration parameters, angle parameters, brightness parameters, frequency parameters, and amplitude parameters, and the device parameters of the adult toy are synchronized with a clock of the erotic multimedia content.

11. The method of claim 9, wherein the physiological information of the human user comprises a physiological status of the user collected or analyzed through sensor elements contained in the adult toy.

12. The method of claim 9, wherein;

the device information of the adult toy comprises at least one of a toy type and a toy quantity, and the content-generative parameters are determined based on the at least one of the toy type and the toy quantity and the control information of the adult toy.

13. The method of claim 1, wherein content scene types corresponding to the erotic multimedia content include at least one of a pre-content scene type, a mid-content scene type, a hotspot scene type, a post-content scene type, and a transition scene type.

14. The method according to claim 13, wherein the generating the erotic multimedia content comprises:

classifying content plots of different content segments of the erotic multimedia content through multiple classifiers;

determining a content scene type corresponding to each of the different content segments of the erotic multimedia content;

determining a feature vector of the content scene type; and generating the erotic multimedia content based on the determined feature vector of the content scene type, the content-generative parameters, and the pre-trained content generation model.

15. The method according to claim 1, wherein the content plotlines corresponding to the erotic multimedia content include content plotlines of at least one of a human body movement change, a human body action amplitude change, and a human body action frequency change.

16. The method according to claim 1, wherein;

the content-generative parameters comprise parameters collected by a gyroscope contained in the adult toy, and the method further comprises:

detecting a posture and a posture change of the human user according to the parameters collected by the gyroscope contained in adult toy; and generating the erotic multimedia content corresponding to the posture and the posture change based on the content-generative parameters and the pre-trained content generation model.

17. A system, comprising:

a memory storing computer-readable instructions; and a processor coupled to the memory and configured to execute the computer-readable instructions, wherein the computer-readable instructions, when executed by the processor, cause the processor to perform operations comprising:

receiving content-generative parameters associated with an output signal output by an adult toy, the adult toy being configured to provide haptic stimulation to a human user;

generating erotic multimedia content based on (i) the content-generative parameters associated with the output signal output by the adult toy and (ii) a pre-trained content generation model; and controlling to present the erotic multimedia content to the human user, wherein the erotic multimedia content comprises content plotlines matching the content-generative parameters, and wherein a type of the erotic multimedia content includes at least one of video, audio, image, or text.

18. The system of claim 17, wherein:

the generating the erotic multimedia content comprises generating the erotic multimedia content based on the content-generative parameters, an input content, and the pre-trained content generation model, and the input content is convertible into the erotic multimedia content in real time or near-real time.

19. The system according to claim 17, wherein the output signal of the adult toy is configured to provide real-time feedback in response to content changes of the erotic multimedia content.

20. A non-transitory computer-readable medium storing instructions that, when executed by a processor of a first viewer device, cause the processor to perform operations comprising:

receiving content-generative parameters associated with an output signal output by an adult toy, the adult toy being configured to provide haptic stimulation to a human user;

generating erotic multimedia content based on (i) the content-generative parameters associated with the output signal output by the adult toy and (ii) a pre-trained content generation model; and controlling to present the erotic multimedia content to the human user, wherein the erotic multimedia content comprises content plotlines matching the content-generative parameters, and wherein a type of the erotic multimedia content includes at least one of video, audio, image, or text.

\* \* \* \* \*